United States Patent
Nordmann et al.

(10) Patent No.: US 11,736,590 B2
(45) Date of Patent: Aug. 22, 2023

(54) METHOD FOR COMMUNICATING DATA REQUESTS TO ONE OR MORE DATA SOURCES AND FOR PROCESSING REQUESTED DATA FROM ONE OR MORE DATA SOURCES IN AN APPLICATION

(71) Applicant: Robert Bosch GmbH, Stuttgart (DE)

(72) Inventors: Arne Nordmann, Stuttgart (DE); Christian Zimmermann, Stuttgart (DE); Christopher Huth, Heilbronn (DE); Fredrik Kamphuis, Kalkar (DE); Martin Ring, Lossburg (DE); Max Camillo Eisele, Renningen (DE); Paulius Duplys, Markgroeningen (DE); Tobias Gehrmann, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/892,424

(22) Filed: Aug. 22, 2022

(65) Prior Publication Data
US 2023/0065540 A1  Mar. 2, 2023

(30) Foreign Application Priority Data
Aug. 25, 2021 (DE) .................... 10 2021 209 319.1

(51) Int. Cl.
*H04L 67/60* (2022.01)
*G06F 21/60* (2013.01)
*H04L 9/40* (2022.01)

(52) U.S. Cl.
CPC ............ *H04L 67/60* (2022.05); *G06F 21/604* (2013.01); *H04L 63/126* (2013.01)

(58) Field of Classification Search
CPC ...... H04L 67/60; H04L 63/126; G06F 21/604
See application file for complete search history.

(56) References Cited

U.S. PATENT DOCUMENTS

| | | | | |
|---|---|---|---|---|
| 10,037,339 | B1* | 7/2018 | Kleinpeter | ............ G06F 16/172 |
| 2003/0070063 | A1* | 4/2003 | Boyle | ..................... H04L 67/59 713/2 |
| 2005/0278307 | A1* | 12/2005 | Battagin | ................. G06F 16/25 |
| 2014/0129130 | A1* | 5/2014 | Kuramura | .......... G01C 21/3874 455/456.3 |
| 2015/0249725 | A1* | 9/2015 | Hurst | .................. H04L 67/1095 709/203 |
| 2016/0179607 | A1* | 6/2016 | Kulkarni | ............ G06F 11/0751 714/4.21 |

(Continued)

*Primary Examiner* — Brian J. Gillis
*Assistant Examiner* — Thao D Duong
(74) *Attorney, Agent, or Firm* — Norton Rose Fulbright US LLP; Gerard Messina (57) ABSTRACT

A method for communicating data requests to one or more data sources. The method includes receiving a data request, with which data of one or more data types are requested, from an application, and checking the availability of one or more data sources that are able to provide the one or more requested data types. The method further comprises: if at least one of the one or more data sources is available, sending a request to the available data source for the requested associated data type that the data source can provide; and, if no data source is available for at least one of the requested data types, sending a request for this data type to a placeholder module.

11 Claims, 4 Drawing Sheets

(56) References Cited

U.S. PATENT DOCUMENTS

| | | | | |
|---|---|---|---|---|
| 2017/0147402 A1* | 5/2017 | Zeng | ............... | G06F 9/5066 |
| 2018/0332108 A1* | 11/2018 | Simek | ............... | H04L 63/062 |
| 2019/0108229 A1* | 4/2019 | Sista | ............... | G06F 16/2282 |
| 2020/0235954 A1* | 7/2020 | Shaffer | ............... | H04L 12/1822 |
| 2020/0293333 A1* | 9/2020 | Kim | ............... | G06F 9/45512 |
| 2020/0358744 A1* | 11/2020 | Lee | ............... | H04L 63/0236 |
| 2021/0004476 A1* | 1/2021 | Bendory | ............... | G06F 21/31 |
| 2022/0334988 A1* | 10/2022 | Brand | ............... | G06F 13/20 |

\* cited by examiner

METHOD FOR COMMUNICATING DATA REQUESTS TO ONE OR MORE DATA SOURCES AND FOR PROCESSING REQUESTED DATA FROM ONE OR MORE DATA SOURCES IN AN APPLICATION

CROSS REFERENCE

The present application claims the benefit under 35 U.S.C. § 119 of German Patent Application No. DE 10 2021 209 319.1 filed on Aug. 25, 2021, which is expressly incorporated herein by reference in its entirety.

FIELD

The present invention relates to a method for communicating data requests to one or a plurality of data sources, and to a method for processing requested data from one or a plurality of data sources in an application, as well as to a computing unit and a computer program for carrying these out.

BACKGROUND INFORMATION

In all areas of technology, from household appliances and consumer electronics to vehicle functions to industrial technology, the networking of devices is playing an increasingly important role. Here, networking includes local connections as well as connections via mobile radiotelephone, the Internet, and other interfaces, for controlling, updating, or generally for exchanging data. Standardly, manufacturers provide corresponding so-called backends, such as servers or services for data exchange, which the corresponding devices can then access. Often, the overall functional capacity of such devices is built on networked applications, so that the use of the respective interfaces and backends is absolutely necessary for complete, error-free operation.

However, as a result the lifespan of such networked products is often limited. In many cases, the interface technology or particular communication protocols that are used are no longer supported and have been replaced by newer technologies. In other cases, manufacturers and providers decide to no longer provide updates for older devices, or to completely discontinue the networked service.

SUMMARY

According to the present invention, a method is provided for communicating data requests to one or more data sources, and a method for processing requested data, in particular in networked devices, is provided, as well as a computing unit and a computer program for carrying these out. Advantageous example embodiments of the present invention are disclosed herein.

In particular, according to an example embodiment of the present invention, a first method is provided for communicating data requests to one or more data sources, in which, if no data source is available for at least one of the requested data types, a request for this data type is sent to a placeholder module. In this way, requests of an application for particular data can be forwarded and communicated to suitable data sources as a function of their availability.

The availability of the one or more data sources can in particular be checked on the basis of stored availability information for the one or more data sources. In this way, the availability does not have to be newly ascertained each time, which accelerates the process.

According to an example embodiment of the present invention, the method can further include the receiving of a response message having at least one data element from at least one data source and/or from the placeholder module in response to the sent requests, and the forwarding of the at least one data element to the application, together with an indication of the origin of the data element. This embodiment thus corresponds to the function of a multiplexer that communicates requests to suitable data sources and that returns the data elements received as response back to the application, the application also being informed about the origin of the messages. The application is thus made capable of carrying out further steps on the basis of the origin of a data element, for example to select a suitable program sequence that is a function of the requested and obtained data elements.

According to an example embodiment of the present invention, the intermediate module that receives the data elements can acquire, for each received data element, the data source that communicated the data element, and, on the basis of the acquired data source, can produce an indication of the origin of the data element. In addition, or alternatively, however, the data element can also already be received together with a corresponding indication of the origin, e.g. via an additional data field in a response message in which an identifier for the respective data source is indicated. In this way, both the intermediate module and the application can recognize the producing data source for each data element.

If, in one of the possible method sequences, at least one data element is received from the placeholder module, this data element can for example include placeholder data that are formed in a data format that is provided for the data type for which the request to the placeholder module was made. In this way, the data elements for the respective data types can be processed in the standard manner, e.g. by an application, without requiring adaptations of the message formats and lengths or other communication parameters. In addition, the indication of the origin makes it possible for an application to recognize that these data are merely placeholder data.

In exemplary specific example embodiments of the present invention, a communication about availability that includes items of availability information about the current and/or future availability of at least one data source can be received and stored for the at least one data source. In this way, data that are as up-to-date as possible are made available concerning which data sources are currently available or will be available at a particular future time, and on this basis the data requests can be suitably forwarded to available data sources or to the placeholder module and processed.

Optionally, to request availability information, one or more availability queries can also be sent to at least one data source. Such availability information can indicate, for example for at least one data source, a date or a period of time after which the data source is no longer available.

In the use of availability requests, which can also be repeated at specified intervals, it can also be determined that it will be checked whether an availability message is received in response to an availability request. If, after a specified time span after the sending of an availability request, or after a specified number of availability requests, no availability message has then been received, the availability of the data source for which the availability request was sent can be stored as not available. With this option, the availability at least at the current time can be evaluated, even if no fixed time is indicated at which the data source is no longer available. In particular, in this way temporary failures of a required data source, e.g. due to lack of network coverage of the communication network that is used, can be recognized and stored. Also on the basis of such temporary or unannounced lack of availability of data sources, the application can then use suitable program paths on the basis of the already-described indications of the origin of the data.

The information about the availability of a data source may also relate not only to the data source itself, e.g. to a particular backend or to a server, but can also include information about the availability of the associated interfaces, connection paths, or protocols to this data source.

According to an example embodiment of the present invention, a further use of the availability data, which can be used in addition or alternatively to the above steps, includes the deletion of stored data that are used for secure communication with the no longer available data source, after the time or date indicated for a data source in the availability information. This makes it possible to timely delete or to overwrite stored private data when they are no longer used for communication with this source. In this way, secret data, such as private digital keys, certificates, and other data, can be prevented from being read out later without authorization.

In addition, the present invention relates to a method for processing requested data of one or more data sources in an application, in which the application steps to be carried out are selected from a set of specified application steps on the basis of the indication of the origin of the data element. As described above, in this way it is possible for the application to flexibly select the program sequence, or particular execution steps, on the basis of the provided data. In order to determine which data are available, in particular the indication of the origin of the respective data elements can be used.

According to an example embodiment of the present invention, if an indication of the origin of at least one first data element indicates that the at least one first data element was produced by a placeholder module, the data type of the at least one first data element can be acquired, the at least one first data element can be discarded, and application steps to be executed can be selected from the set of specified application steps that do not require the data type of the at least one first data element in order to be executed. In particular, in this way a method can also be reliably carried out that uses data from particular sources and fundamentally relies on this networking, in that steps for which, e.g. temporarily or permanently, no data are any longer available due to non-availability of a data source can be replaced by alternative steps. In this way, the lifespan of such an application is made substantially independent of the availability and support of the respective networked data sources, e.g. backends and cloud storage.

A computing unit according to the present invention, e.g., a control device of a motor vehicle or a control unit of a networked device, is set up, in particular in terms of programming, to carry out a method according to the present invention.

The implementation of a method according to the present invention in the form of a computer program or computer program product having program code for carrying out all method steps is also advantageous because this results in particularly low costs, in particular if an executing control device is being used for other tasks and is therefore present anyway. Finally, a machine-readable storage medium is provided having a computer program as described above stored thereon. Suitable storage media or data carriers for providing the computer program are in particular magnetic, optical, and electric memories, such as hard drives, flash memories, EEPROMs, DVDs, and others. The downloading of a program via computer networks (Internet, intranet, etc.) is also possible. Such a download may take place in a wired or cable-bound fashion, or wirelessly (e.g. via a WLAN network, 3G, 4G, 5G, or 6G connection, etc.).

Further advantages and embodiments of the present invention result from the description and the figures.

The present invention is shown schematically in the figures on the basis of exemplary embodiments, and is explained below with reference to the figures.

DETAILED DESCRIPTION OF EXAMPLE EMBODIMENTS

Figure 1:
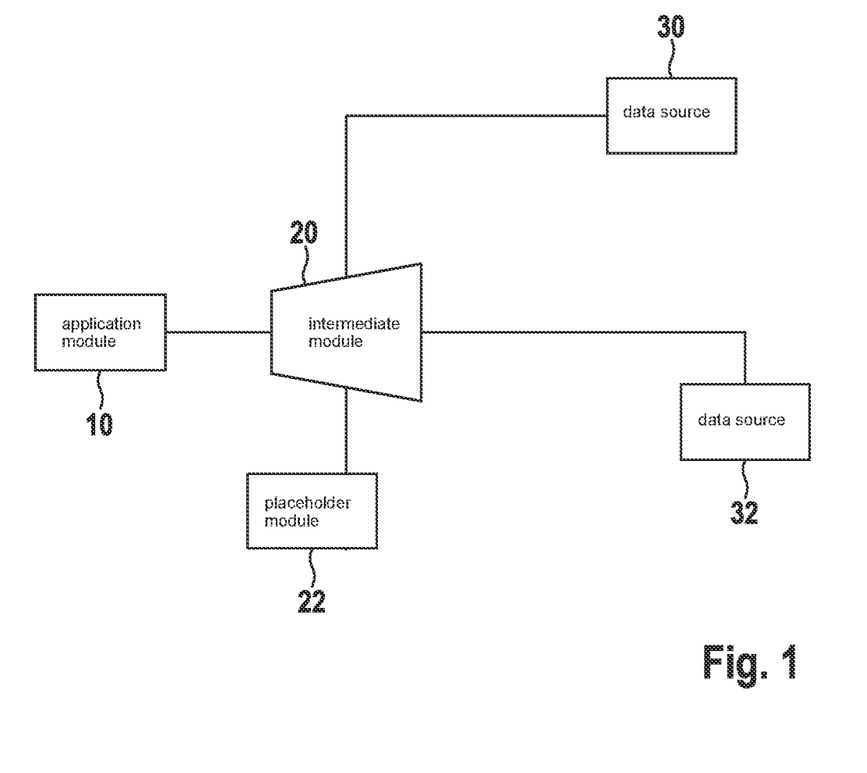
FIG. 1 schematically shows a networked system in which specific embodiments of the present invention can be realized.

FIG. 1 shows, in exemplary fashion and schematically, the logical architecture of a system in which specific embodiments of the present invention can be used.

Here an application module 10 is provided that carries out at least one application that uses data from other data sources 30, 32, or from other modules. For this purpose, the application module can communicate requests to these data sources, or can also receive and process data without a request. These can in principle be data sources inside or outside the entity in which the application module is situated.

A networked vehicle is taken as an example. Application module 10 can for example be implemented by software and/or hardware, and can be capable of carrying out particular application steps of a software application. In the present example, this can also be an engine control unit (ECU) or some other part of the control system in the vehicle.

In this application module 10, as an example an application is carried out for route planning for the vehicle. In order to determine the optimal travel route from a series of possible travel routes, the application can include various data. These data can include for example traffic notifications, current weather conditions, roadway conditions, etc., for each of the possible routes to a specified destination. The path length or travel time can also be taken into account.

For the data required by the application, various data sources 30, 32 may be available. These may be inside the vehicle, such as a temperature sensor for the outside temperature, or a road map stored in a storage element in the vehicle. In addition, data can be used that are obtained from other sources via suitable interfaces. For example, as a data source 30 a remote computing unit outside the vehicle (e.g. a so-called central backend of the manufacturer) can be provided that collects all required data, such as traffic and weather data, and regularly communicates it to the application in the vehicle. The vehicles can be configured at the manufacturer so that this backend is first automatically available to every new vehicle. The data can be communicated by central backend 30 to all connected vehicles, or their control units or applications, for example at regular intervals; alternatively or in addition, data can also be communicated in response to a request.

In addition, as further data source 32 at least one computing unit that is reachable only in particular geographic areas (e.g. a so-called local backend, for example an edge service) can be provided that can provide for example only a part of the data required by the application. For example, this local backend may provide weather data and current roadway conditions, but not traffic reports. However, any other data sources may also be provided, e.g. local infrastructure from which a vehicle control unit can receive local traffic reports via short-range communication possibilities (vehicle-to-infrastructure), or also a network of other vehicles that each forward their collected data to vehicles in their vicinity (vehicle-to-vehicle).

In addition, the system includes an intermediate module 20 that is logically configured between data sources 30, 32 and application module 10. This intermediate module 20 can for example forward requests of application module 10 to the respective data sources 30, 32. This intermediate module 20 is also able to receive data from these various data sources 30, 32, and to communicate them, in suitable messages, to application module 10. Here, messages can be forward in unprocessed form, or they may also have been modified in their data format or protocol or in some other way. Optionally, data from a plurality of sources can be combined in a message to the application module, or processed with one another.

In general, the intermediate module can be realized by software and/or hardware, for example as an observer module that is able to monitor the data traffic communicated between the application and the data sources in a communications network at a specified location, e.g. the data traffic over a bus system in the vehicle.

Intermediate module 20 can, in exemplary specific embodiments, in particular have functions that correspond to a multiplexer/demultiplexer. Here, the intermediate module can receive a request for different data types from the application, and can thereupon produce, or forward, requests to those data sources that provide these data types. The intermediate module can then in turn forward the data elements received by the data sources to the application, and optionally can also combine a plurality of data elements and/or further parameters to form a message that is communicated to the application.

Here, intermediate module 20 can for example be a module that is able to evaluate the data traffic between the subscribers but that does not perform any further functions apart from the communication of the data requests. In particular, the intermediate module does not have to be a separate hardware module, but rather can be used for example as part of the applications in the application module, as part of a control software, or as part of a bus controller. The intermediate module can also be implemented in a network layer of an element such as a control unit (e.g. of an engine controller) in which the application is also executed.

Alternatively, an intermediate module could be implemented directly in an interface device, e.g. in a mobile radiotelephone interface (e.g. 4G, 5G interface), via which data can be received from external sources.

Moreover, intermediate module 20 can be set up to collect, read out, and/or evaluate information about the availability of the various data sources. If one of the data sources required by an application in application module 10 is not available, then, according to various specific embodiments, the intermediate module can react to this in order to nonetheless enable an optimal and error-free execution of the application.

For this purpose, in the messages that are communicated from the intermediate module to the application module, and that include the data elements received by the data sources, there can be a possibility for identifying the origin of the contained data elements. For example, an origin identifier can be contained in the message and can be linked with a data element in the message in order to indicate the origin of this data element. If a data source is not available, the origin identifier can indicate a placeholder.

If a message includes a plurality of data elements, a respective associated origin identifier can also be indicated for a plurality, or each, of these. Here, the origin identifier can be added by the data source itself from which the data element originates. Alternatively, however, the intermediate module can also acquire the data source from which the data element originates and can add a corresponding origin identifier before the data element, and the origin identifier, are further communicated to the application module in a message. For this purpose, for example a simple data field can be provided in a message protocol that is inserted e.g. before or after a data element in the message or is linked logically in some other way to the data element, the data source being indicated in the data field in suitable form. For this purpose, for example in the application there can be an assignment table of the origin identifier to the data sources. Of course, all messages used and described here can also include further useful data, parameters, data fields, and contents, even if these are not mentioned here.

It can also be provided that the further course of the application executed in the application module is at least partly a function of which data elements, from which data sources, are present. The application can implement this for example on the basis of the origin identifier that is received in the message and that is linked to the respective data element. The application can then select the most suitable path or program sequence possible with the respective data that are present. Here, a standard program sequence can also be selected that is always used when all data sources (or all data sources used for the following steps) are available as planned.

If one of the required or requested data sources is not available, the intermediate module can acquire this state of the respective data source. The non-availability of the data source may already be known to the intermediate module, for example through a previous message and/or a stored parameter. Optionally, however, it can also be determined that the intermediate module rates a data source as not available if, for example, there is no response to a request within a specified time.

In order to correctly communicate the requests of an application to various data sources and, in the case of data sources that are not available, to forward partial requests to a placeholder module, the intermediate module should be as well informed as possible at all times about the availability of the data sources. For this purpose, it can be capable of recognizing the non-availability of data sources, or of receiving information about this.

For this purpose, the intermediate module can for example send regular availability requests to each known data source. The known and required data sources can for example be communicated to the intermediate module by each application once or regularly, and then stored there. Alternatively, when there is an initial data request from an application to a particular data source, the intermediate module itself can evaluate the destination and can store this data source as a required data source, optionally in connection with the associated application and the requested data types. Likewise, the intermediate module can store data sources that are communicating data elements for an application for the first time. Modifications of the required data sources, which can occur e.g. due to an update to an application, can also optionally be communicated by the application and/or by one of the data sources. The data sources stored in this way can then be used by the intermediate module as the basis for the availability queries.

The availability requests by the intermediate module can e.g. be communicated to the data sources periodically at defined intervals, or triggered by particular conditions. Different temporal intervals for the availability inquiries may also be defined for different data sources. In other specific embodiments, it can also be provided that the intermediate module makes availability queries to a data source only if this source has not communicated any application data for a longer period of time; here, it is possible to define any desired time span for the triggering of the availability query.

The data sources should preferably respond to the availability queries with an availability communication to the intermediate module. In the simplest specific embodiments, this response can confirm only the current availability, without further indications. It is also possible for the availability communication to indicate an estimated end of the availability, for example as a calendar date or as a time span starting from the transmission of the availability communication. In later messages, this estimated end could also be modified, so that the intermediate module can receive updated information about the availability. Alternatively, an availability communication could also contain only an indication of at least how long the data source will still be available, or may contain no time indication at all. As a further variant, it can also be defined that a data source is identified by the intermediate module as not available if a specified number of availability queries have not been responded to (e.g. 10 or 100 requests with no response), or if, within a specified time span, no valid response to an availability query is received. The variants can of course also be combined with one another.

It is moreover also possible that an individual data source, or also a completely different module that communicates with the intermediate module, communicates information about the availability of other data sources, either as a separate communication or together with the standard own availability communication. This approach is appropriate in particular when one of the data sources (e.g. a central manufacturer-side backend) has such information about the other data sources, but these other data sources are not themselves set up to handle availability queries. In addition or alternatively to all these specific embodiments, availability communications can also be sent as a part of application data together with data elements, for example as an own data field that can be read out by the intermediate module and/or the application. Optionally, it could also be provided that the intermediate module sends an availability query to a backend only when no application data and/or no availability communications have been received over a determined time span. In principle, it is also possible for the various data sources to send such availability communications to the intermediate module automatically, once or at regular intervals, e.g. after an initialization when there is a first contact between the intermediate module and the data source, without these availability communications necessarily having been preceded in each case by an availability request. If, for example, the shutting down of a particular backend is provided and is planned for a specific future date, this date can be communicated by the backend itself, or by some other source, to all the devices (e.g. vehicles) that use this backend. This communication can also take place multiple times in order to be sure that all destinations are reached.

The information obtained in this way about the availability of data sources can then be suitably stored and processed by the intermediate module. The availability information can also be stored together with the associated application, together with the data elements provided by the data sources, and/or with further parameters. In a possible specific embodiment, for the storing and assignment of the availability data, e.g. the same origin identifier can be used that is also communicated to the application to indicate the origin of the data element.

For the case of a data source that is not available, the intermediate module can communicate the associated query, or a part thereof, to a placeholder module 22 that can be implemented as a hardware and/or software module. This placeholder module can return placeholder data to the intermediate module that are communicated to the application module in place of the data that are not available in the response message. Here, the placeholder module has no other functionality. In particular, the placeholder module can for example also be implemented as part of the intermediate module itself, and/or as part of the application in the application module. However, it can also be a separate application, or can for example be integrated in an interface module. Even if the placeholder module is described here as an independent module, it can also be provided as a subfunction of a different application, or of a different module.

The origin identifier described above can in this case then be set by the placeholder module or by the intermediate module to a value that names the placeholder module as origin, or that is recognized by the application as a placeholder. Alternatively or in addition, the produced placeholder data can themselves have a format that is implicitly recognized by the application as placeholder data, such as a particular character sequence.

For the placeholder data themselves, for example a data format or protocol can be selected that corresponds to the data format that is defined for the originally requested data. If, for example, it is defined that traffic messages are transmitted in a particular number of data blocks having a particular size, then, in the case of non-availability of the backend responsible for traffic messages, the same number of data blocks, with the same length, can be communicated in the message as placeholder data. In this way, the message protocol of the application and associated execution steps do not have to be substantially modified.

Because no further information is to be communicated with these placeholder data, the content does not play a role as long as the application can recognize, on the basis of the placeholder data themselves and/or an origin identifier linked therewith, that these are not the actually requested data, but are only placeholder data having no function.

Figure 2A:
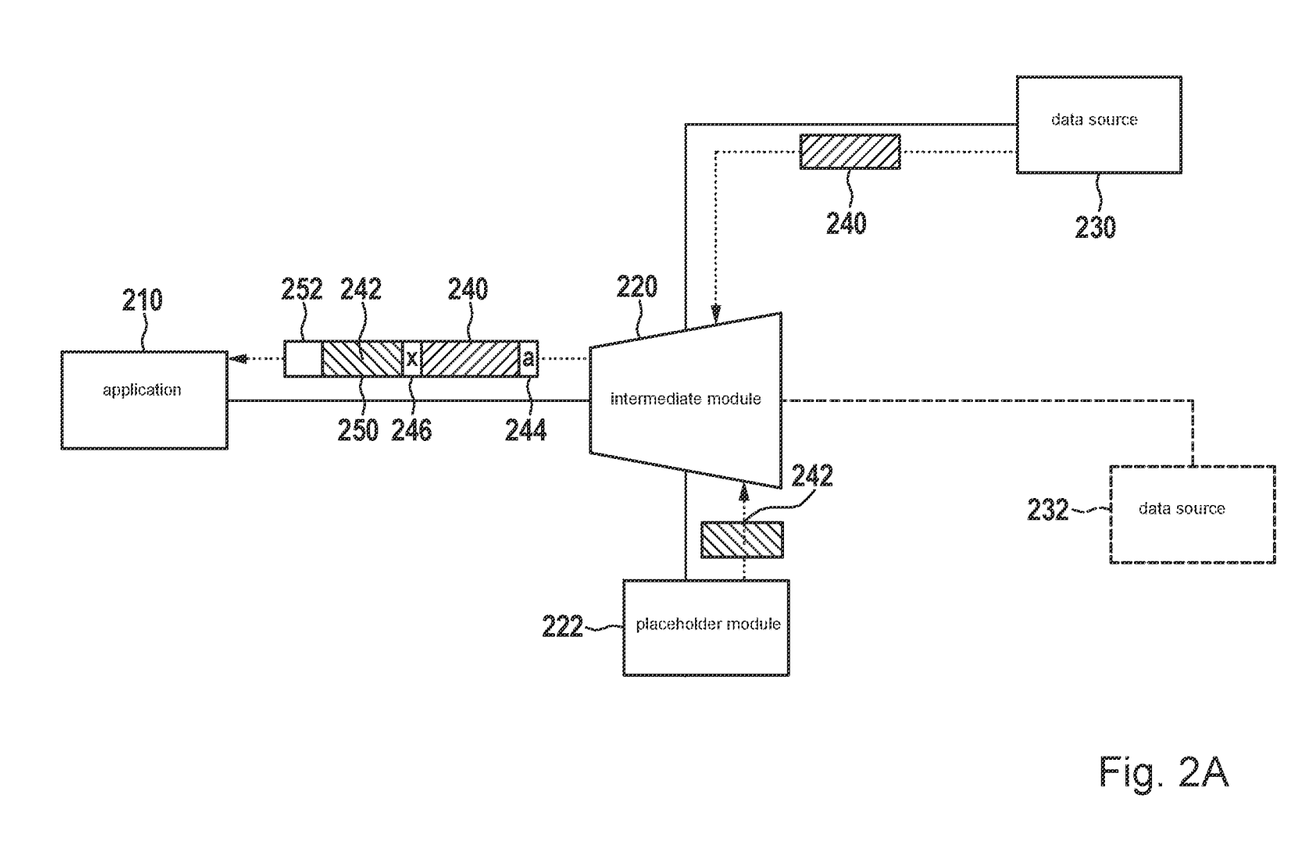
FIGS. 2A and 2B show exemplary networked systems in which a data source is no longer available, with the data elements communicated in each case, according to the present invention.
Figure 2B:
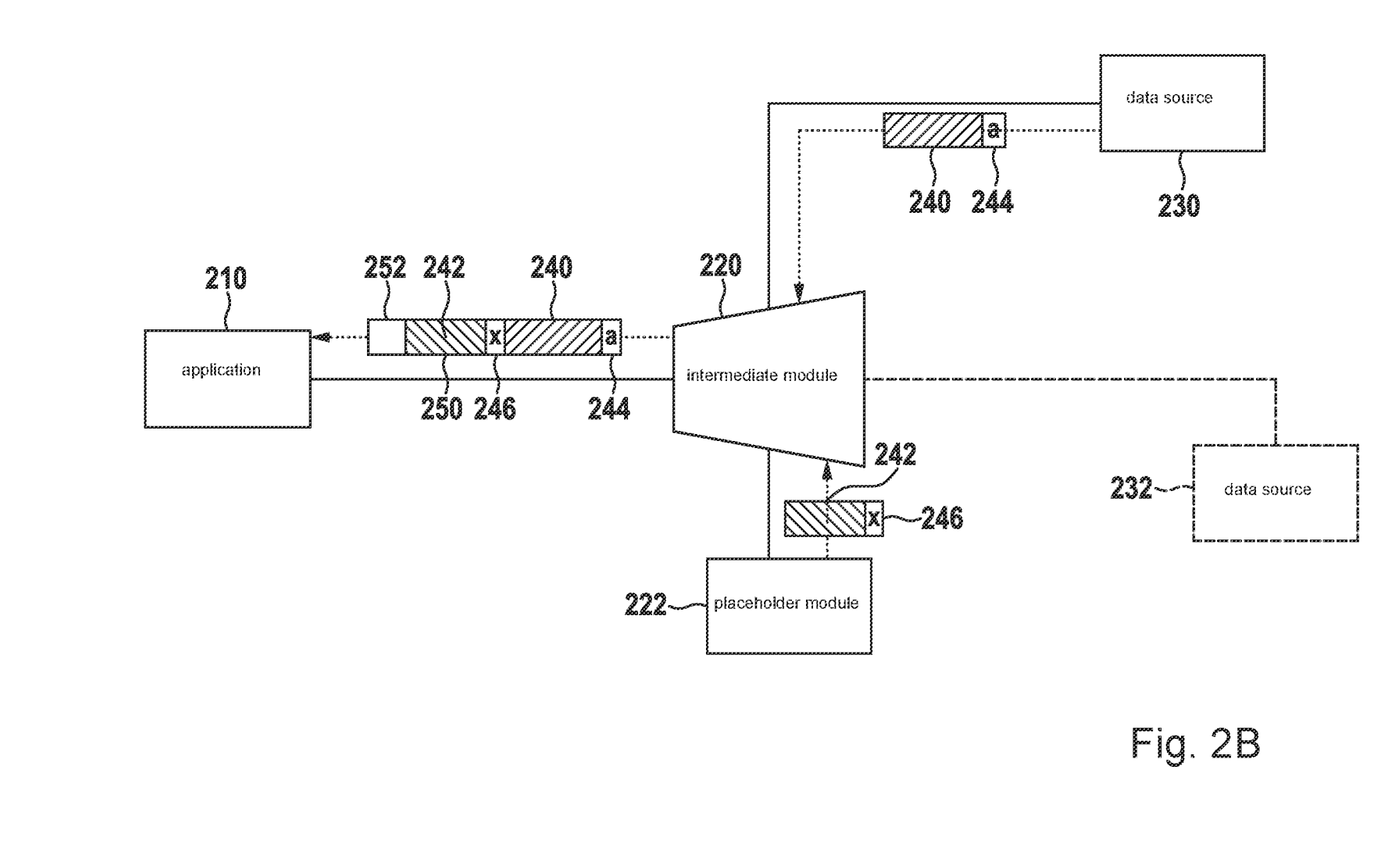

FIGS. 2A and 2B each show, in exemplary fashion, a system as in FIG. 1, in which the reference characters of the corresponding elements have been increased by 200. Here only one of the data sources 230 is still available, while second data source 232 is not available or cannot be reached. After corresponding requests, intermediate module 220 receives a first data element 240 from the available data source 230, as well as a placeholder data element 242 from placeholder module 222.

In FIG. 2A, as an example these data elements are each transmitted by the data sources without an origin identifier. Intermediate module 220 recognizes the sender of the respective data and adds, on this basis, an associated origin identifier to each of the data elements 240, 242. Here, the origin identifiers can for example be communicated in data fields linked to the respective data elements, in a message 250. Thus, in this example the message 250 from intermediate module 220 to application 210 includes placeholder data 242 with an associated origin identifier 'x' 246, data element 240 with an associated origin identifier ('a') 244, and, optionally, further useful data, parameters, and protocol data 252.

In FIG. 2B, in an alternative specific embodiment, data element 240 is already communicated by data source 230 together with an origin identifier 244, and the placeholder data are also already provided with an origin identifier 246. Subsequently, as in the previous example, the two data elements 240, 242 and the two origin identifiers 244, 246 are communicated to application 210 in a message 250.

Figure 3:
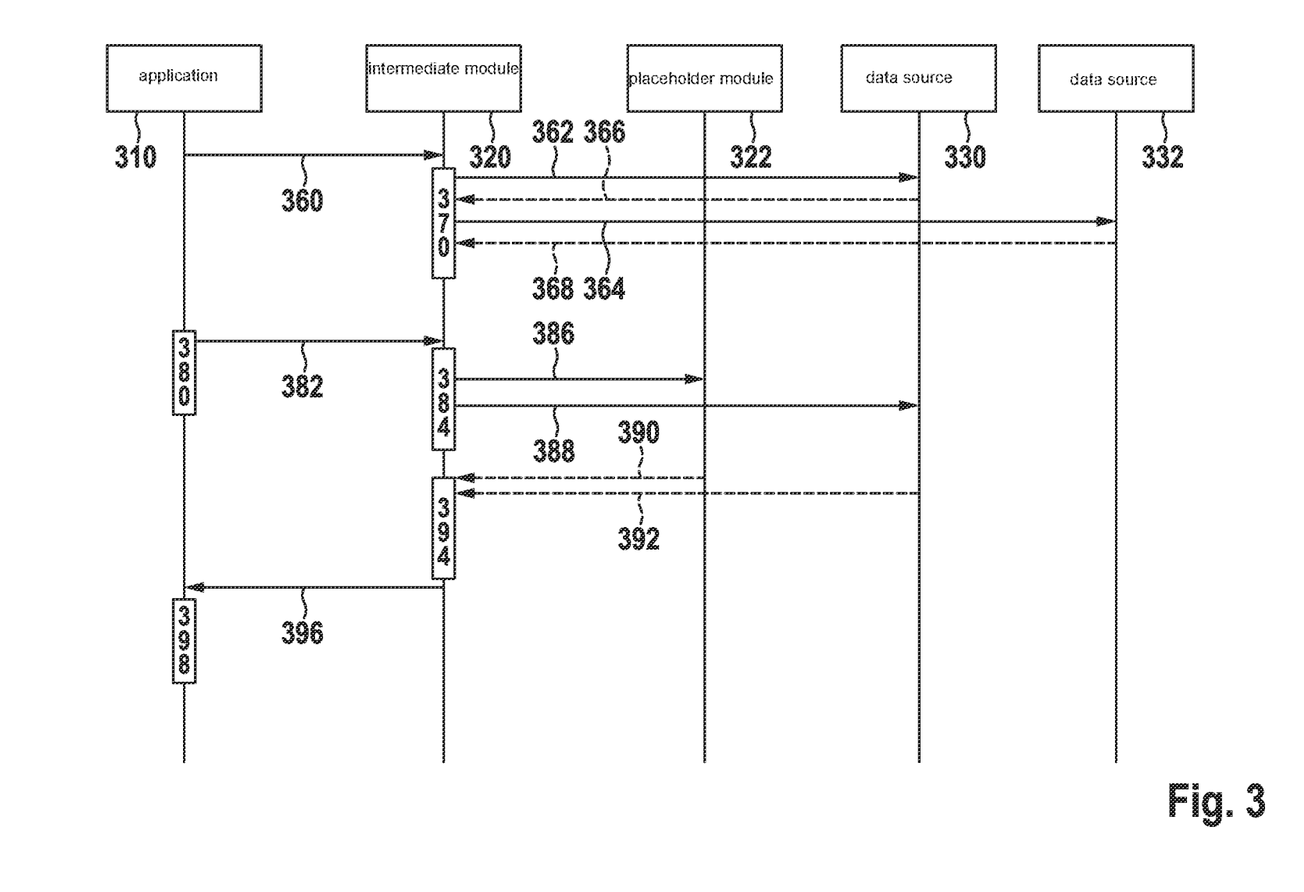
FIG. 3 shows, as an example, a sequence diagram for the involved modules and a possible method sequence, according to the present invention.

FIG. 3 shows an example of a sequence diagram for the communication between an application 310, an intermediate module 320, and various data sources 330, 332. In the upper part, as an example availability requests 362, 364 of the intermediate module to data sources 330, 332 are shown that are responded to with corresponding availability communications 366, 368. Intermediate module 320 stores the received items of information about the availability of the data sources in block 370. These steps can be repeated arbitrarily often and independently of the steps shown below.

When application 310, in an execution step 380, requires data and therefore makes a data request 382 for one or more data types to intermediate module 320, in block 384 the intermediate module can check, in the stored availability data, whether the associated provided data sources are still available. The request of the application can for example include only the desired data types, so that the selection of a suitable and available data source is carried out completely by the intermediate module. Alternatively, however, request 382 of the application can also indicate, together with the required data type, the desired or expected data source 330, 332, e.g. also as a direct addressing of these data sources, which is then read out by the intermediate module and checked for availability.

Subsequently, as described above, the data elements are produced by placeholder module 322 and/or by a data source 330 and are communicated to intermediate module 320 in response messages 388, 390. For this purpose, placeholder module 322 can for example also receive from the intermediate module an indication of the data type that is to be replaced by the requested placeholder data in order to return placeholder data in the corresponding data format. Intermediate module 320 processes the data elements in block 394, and in step 396 forwards them to the requesting application; here, as part of the processing in block 394, a plurality, or all, of the data elements can be combined in a message 396, but it is also possible for individual messages to be communicated for each data element together with the respective origin identifier. Here, the communicated data elements, as described in connection with FIGS. 2A and 2B, may have already each been provided with an origin identifier by the data sources, or the receiving intermediate module can link this origin identifier with the data element in each case during the processing in block 394, and communicate it to the application. Finally, in block 398 the application can read out the data elements and their associated origin identifiers from the received message 396, and on this basis can select from a plurality of available execution steps.

Thus, if, in the example of a route planning, an application queries the data types traffic notifications, roadway conditions, and weather, these data can all be requested from a single central backend, as long as this backend is available. If, however, the intermediate module has information stating that this backend is not available and only an alternative second data source is available that can communicate roadway conditions and weather conditions but cannot communicate traffic notifications, then for the data type "traffic notification" the intermediate module can communicate a request to the placeholder module, while the requests for "roadway conditions" and "weather" are communicated to the alternative data source. The intermediate module thus receives in return data elements for the data types "weather" and "roadway conditions" that optionally may already have been provided with an origin identifier of the second data source; otherwise, the intermediate module produces the origin identifier for the data elements. Moreover, the intermediate module receives a data element of the placeholder module that includes placeholder data having no further function; here the placeholder data can optionally be in the data format for the requested data type "traffic notification." The intermediate module then communicates the received data elements and the placeholder data to the application, in each case together with an origin identifier that indicates the origin of the data. The application receives the data elements and, on the basis of the origin identifiers, can read out from which data source the data elements originate. Because there are no valid traffic data, the application can then select a program path that does not use traffic data, but rather is based more strongly on other route features for the planning. In a further case, it would be possible for a suitable data source to be available for only one, or none, of the requested data types, so that only placeholder data would then be communicated back. Here as well, a program path can then be selected that plans a suitable route only on the basis of the available map material, and does not require the requested data.

The information that the intermediate module and/or the application may have about the availability of data sources can also be used for further purposes. For example, for secure communication between a plurality of subscribers, such as an application and the data sources, digital certificates or secret keys for encrypting and signing messages are used. Access data such as passwords and similar identifiers can also be stored. If an application communicates with a plurality of data sources, a plurality of different keys, certificates, passwords, and other secret data material that are used for automatic communication can therefore also be stored. However, other applications should not have access to these data, and unauthorized reading out of such data after disposal of a device should be prevented to the greatest possible extent. Thus, if through the intermediate module and the described availability messages, the time starting from which a particular data source will no longer be available is known, this information can be used to initiate an automatic deletion or overwriting of the secret data material. The overriding or deletion can here be performed by the intermediate module. In other specific embodiments, the intermediate module can also forward the information about the availability of data sources at least partially to an application that can then overwrite the associated secret data material. This can be an application that uses the data sources; however, a separate security module (e.g. an HSM, Hardware Security Module) may for example also be provided that carries out the encrypted communication and is informed about the end of the availability of a data source. In all specific embodiments, it is also possible that, given the presence of such a security module, the intermediate module is fashioned as a part thereof, or as part of the associated software. It is also possible for there to be a plurality of intermediate modules in a device or in a system, e.g. an intermediate module that is implemented together with the application and a further intermediate module that is part of the communication interface. In other cases, multi-stage intermediate modules may also be provided.

In this context, it will be understood that the data sources thus designated here can act not only as sources for the required data, but can also perform other functions, e.g. a two-way data exchange with the application in the application module or with other modules and devices. For example, it can be provided that data are communicated by an application to a remote backend or to a cloud memory, and are stored there for further use. Parameters or information of any type, which can optionally also influence the returned data, can also be communicated to the data sources. Moreover, e.g. settings and profile data can be communicated in both directions. In all these cases, the availability information can also be used to suitably forward or partition the data. If, for example, a particular storage possibility connected via a network (e.g. a cloud memory of the manufacturer) will no longer be available for data of an application, the intermediate module can communicate the data to be stored to a suitable alternative storage location, such as a local memory module or some other storage possibility.

The methods described herein offer a possibility with which networked control units and devices can also continue to be used when parts of the associated networked architecture are no longer supported or no longer exist or are not reachable. In this way, the lifespan of a networked device can be realized largely independently of the availabilities of the further communication subscribers and backends, without requiring for this purpose new updates of the software or even of the hardware in the device, but also without curtailments of the original use of networked functions.

What is claimed is:

1. A method for communicating data requests to one or more data sources, comprising:
    receiving from an application a data request that requests a plurality of data types, each have been associated with a respective data source; and
    in response to the receipt of the data request:
        for each of the plurality of data types requested by the data request, determining whether the respective data source that has been associated with the respective data type has a current status of being available;
        for a first one of the respective data sources, for which a result of the determination is that the current status of the respective data source is that the respective data source is available:
            transmitting to the first respective data source a request for the respective data type with which the first respective data source is associated;
            receiving from the first respective data source a data element of the respective data type with which the first respective data source is associated; and
            transmitting to the application the received data element of the respective data type with which the first respective data source is associated with an associated source identifier identifying the first respective data source; and
        for a second one of the respective data sources, for which a result of the determination is that the current status of the respective data source is that the respective data source is unavailable:
            transmitting, to a placeholder source instead of the second respective data source, a request for placeholder data;
            receiving from the placeholder source the requested placeholder data; and
            transmitting to the application the received placeholder data with an associated source identifier identifying the placeholder source as being a source of the placeholder data, wherein the placeholder data, as transmitted to the application, has one of a plurality of predefined formats selected depending on a data type that has been predefined for the respective data type with which the second respective data source is associated.

2. The method as recited in claim 1, wherein the current statuses of availability are checked based on stored items of availability information for the data sources.

3. The method as recited in claim 1, further comprising:
    in response to the receipt of the data element from the first data source, producing the source identifier transmitted to the application.

4. The method as recited in claim 1, further including:
    receiving an availability communication that includes items of availability information about a current and/or future availability of at least one data source; and
    storing the items of availability information for the at least one data source.

5. The method as recited in claim 1, further comprising:
    sending an availability request to each of the respective data sources in order to request items of availability information.

6. The method as recited in claim 5, wherein the sending of the availability request is repeated at specified intervals, and the method further comprises:
    acquiring whether an availability communication was received in response to the availability request; and
    when, after a specified time span after the sending of an availability request, no availability communication has been received, or when, after a specified number of availability requests, no availability communication has been received, storing the availability of the data source for which the availability request was sent as not available.

7. The method as recited in claim 4, wherein the items of availability information indicate a date or a time span after which the respective data source will cease to be available.

8. The method as recited in claim 7, further comprising:
    after reaching the date or time span, deleting stored data that are used for secure communication with the respective data source, which is no longer available.

9. A method for processing requested data from one or more data sources in an application, comprising:
    receiving a message from an intermediate module, the message including a data element and an associated indication of an origin of the data element;
    based on (a) the indication of the origin of the data element indicating that the data element was produced by a placeholder and (b) a recognized data type of the at least one first data element:
        discarding the data element; and selecting, from a set of specified application steps, application steps that do not require the data type of the data element in order to be executed; and executing the selected application steps.

10. A computing unit configured to communicate data requests to one or more data sources, the computing unit configured to:

receive from an application a data request that requests a plurality of data types, each have been associated with a respective data source; and in response to the receipt of the data request:

for each of the plurality of data types requested by the data request, determine whether the respective data source that has been associated with the respective data type has a current status of being available;

for a first one of the respective data sources, for which a result of the determination is that the current status of the respective data source is that the respective data source is available:

transmit to the first respective data source a request for the respective data type with which the first respective data source is associated;

receive from the first respective data source a data element of the respective data type with which the first respective data source is associated; and transmit to the application the received data element of the respective data type with which the first respective data source is associated with an associated source identifier identifying the first respective data source; and for a second one of the respective data sources, for which a result of the determination is that the current status of the respective data source is that the respective data source is unavailable:

transmit, to a placeholder source instead of the second respective data source, a request for placeholder data;

receive from the placeholder source the requested placeholder data; and transmit to the application the received placeholder data with an associated source identifier identifying the placeholder source as being a source of the placeholder data, wherein the placeholder data, as transmitted to the application, has one of a plurality of predefined formats selected depending on a data type that has been predefined for the respective data type with which the second respective data source is associated.

11. A non-transitory machine-readable storage medium on which is stored a computer program for communicating data requests to one or more data sources, the computer program, when executed by a computer, causing the computer to perform the following steps:

receiving from an application a data request that requests a plurality of data types, each have been associated with a respective data source; and in response to the receipt of the data request:

for each of the plurality of data types requested by the data request, determining whether the respective data source that has been associated with the respective data type has a current status of being available;

for a first one of the respective data sources, for which a result of the determination is that the current status of the respective data source is that the respective data source is available:

transmitting to the first respective data source a request for the respective data type with which the first respective data source is associated;

receiving from the first respective data source a data element of the respective data type with which the first respective data source is associated; and transmitting to the application the received data element of respective data type with which the first respective data source is associated with an associated source identifier identifying the first respective data source; and for a second one of the respective data sources, for which a result of the determination is that the current status of the respective data source is that the respective data source is unavailable:

transmitting, to a placeholder source instead of the second respective data source, a request for placeholder data;

receiving from the placeholder source the requested placeholder data; and transmitting to the application the received placeholder data with an associated source identifier identifying the placeholder source as being a source of the placeholder data, wherein the placeholder data, as transmitted to the application, has one of a plurality of predefined formats selected depending on a data type that has been predefined for the respective data type with which the second respective data source is associated.

* * * * *